(12) United States Patent
Hawker et al.

(10) Patent No.: US 7,732,553 B2
(45) Date of Patent: Jun. 8, 2010

(54) METHOD OF PRODUCING ENCAPSULATION RESINS

(75) Inventors: Craig J. Hawker, Santa Barbara, CA (US); Rosette G. Guino, Long Beach, CA (US); Keiichi Seki, Kanagawa-ken (JP); Kenichi Takizawa, Kitakyushu (JP); Yutaka Moti, Kitakyushu (JP)

(73) Assignee: The Regents of the University of California, Oakland, CA (US)

( * ) Notice: Subject to any disclaimer, the term of this patent is extended or adjusted under 35 U.S.C. 154(b) by 202 days.

(21) Appl. No.: 12/072,891

(22) Filed: Feb. 28, 2008

(65) Prior Publication Data

US 2009/0218592 A1     Sep. 3, 2009

(51) Int. Cl.
 *C08G 77/08* (2006.01)
(52) U.S. Cl. .............................. 528/14; 528/31; 528/25
(58) Field of Classification Search .................... 528/31, 528/14, 25
 See application file for complete search history.

(56) References Cited

U.S. PATENT DOCUMENTS

| 5,646,687 | A | 7/1997 | Botsford, III et al. |
| 6,204,523 | B1 | 3/2001 | Carey et al. |
| 6,590,235 | B2 | 7/2003 | Carey et al. |
| 6,686,676 | B2 | 2/2004 | McNulty et al. |
| 7,030,058 | B1 * | 4/2006 | Nakabayashi ............... 502/401 |
| 7,160,972 | B2 | 1/2007 | Young et al. |
| 7,241,852 | B2 | 7/2007 | Walker et al. |
| 7,261,441 | B2 | 8/2007 | Ng et al. |
| 2003/0162929 | A1 * | 8/2003 | Verbruggen et al. ........... 528/10 |
| 2004/0063840 | A1 | 4/2004 | Starkey |
| 2006/0084282 | A1 | 4/2006 | Dubois et al. |
| 2006/0122351 | A1 * | 6/2006 | Laine et al. ................... 528/31 |

FOREIGN PATENT DOCUMENTS

| EP | 1854831(A1) | 11/2007 |
| JP | A-2002-203989 | 7/2002 |
| JP | A-2004-356506 | 12/2004 |
| WO | WO2005/085303 | 9/2005 |
| WO | WO2006/055456 | 5/2006 |

OTHER PUBLICATIONS

Proc. of SPIE vol. 6192, 619202 (2006).
K. Torii, et al., *Physica B*, 302, 268-276 (2001).

* cited by examiner

*Primary Examiner*—Kuo-Liang Peng
(74) *Attorney, Agent, or Firm*—Berliner & Associates

(57) ABSTRACT

A process is provided for producing curable polyorganosiloxanes where noble metal oxides are used as hydrosilylation catalysts. The noble metals can be used in solid granular form or as part of a fixed bed, and do not form part of the final curable composition or cured product. The cured polyorganosiloxanes have increased stability and can be used as encapsulation resins at a temperature far lower than 300° C., have excellent light transmission properties (colorless transparency) in a wavelength region of from ultraviolet light to visible light, light resistance, heat resistance, resistance to moist heat and UV resistance, and do not generate cracks and peeling even in use over a long period of time.

14 Claims, 8 Drawing Sheets

BTESE     BTESO

BTESM     BTESEt

Table 1

|  | Visual observation of cured product | Visual observation after 260°C heating test |
|---|---|---|
| Example 6 Resin A | Colorless No crack or peeling | Peeling 0 in 5 |
| Example 7 Resin B | Colorless No crack or peeling | Peeling 0 in 5 Yellowing a little bit when heated at 260°C |
| Comparative Example 8 Resin C | Colorless Crack and peeling were generated | (Peeling 5 in 5 before heating test) Yellowing a little bit when heated at 260°C |
| Comparative Example 9 Resin D | Colored in slightly pale yellow No crack or peeling | Peeling 3 in 5 Yellowing when heated at 260°C |

Table 2

|  | Ratio of the total light flux after the accelerated deterioration test for 500 hours to the total light flux before the accelerated deterioration test |
|---|---|
| Example 10 Composition E | 97% |
| Example 11 Composition F | 77% |
| Example 12 Composition G | 69% |

Figure 8

METHOD OF PRODUCING ENCAPSULATION RESINS

FIELD OF THE INVENTION

The present invention relates to methods for the production of encapsulating materials preferably used in the fields of semiconductor luminescent devices and aerospace. More specifically, the invention relates to methods of producing curable polyorganosiloxanes, which when cured show excellent heat resistance and UV resistance performance.

BACKGROUND OF THE INVENTION

High brightness light emitting diodes (HBLEDs) offer enhanced energy efficiency thus making them suitable for specialty lighting applications. An LED device is usually composed of the LED chip fabricated onto a substrate and then encapsulated by a material acting as a lens. The following are the operational requirements of a material to be utilized as an encapsulant of LEDs: optical clarity, high temperature resistant, UV resistant, high refractive index and variable mechanical properties (preferably soft to hard materials).

Encapsulant materials must be optically transparent (greater than 90% transmittance) and should be able to withstand high temperatures, for extended periods of time, without degradation in mechanical and optical performance. The LED device encounters high temperature conditions during the device fabrication (soldering up to 260° C.) and during the actual device operation (around 150° C. for thousands of hours).

Epoxy resins have conventionally been used as a transparent resin for the encapsulation (1, 2). Also, PMMA (polymethylmethacrylate-PMMA), polycarbonate, and optical nylon have been used. However, optical properties of such conventional resins degrade over time. Coloration, or "yellowing", occurs either by heat induced degradation (heat resistance) or via prolonged irradiation with short wavelength light (ultraviolet-resistance). This results in water entering from the encapsulated portion to disturb performance of LED, and the resin discolors by ultraviolet light emitted from LED to decrease light transmittance of the transparently encapsulated portion. Mechanical degradation of the encapsulant also results in cracking, shrinking or delamination from the substrate. Thus, it is desirable to have an encapsulant system that allows variation of mechanical properties, from soft elastomers to hard plastics. The encapsulant must be hard enough to serve as mechanical support for the LED component, and at the same time must be soft or flexible enough to relieve internal stress during the device fabrication (prevent damage to LED chip or wires) and during temperature cycling (expansion and contraction of materials with different thermal expansion coefficients).

To overcome the above problems, a fluorine-containing cured product in transparent encapsulation of an emission element has been proposed (3). Although, this fluorine-containing cured product has excellent colorless transparency, light resistance and heat resistance as compared with the epoxy resin, but has the problem that adhesion to a material to be encapsulated is poor, and it is liable to peel from the material to be encapsulated. Furthermore, a material of LED chip, specifically a material of an emission layer of LED chip, has high refractive index, specifically refractive index of light in a visible light region, of from 2.5 to 3.0, but the fluorine-containing cured product has low refractive index of light in the same wavelength region. Therefore, the pick-up efficiency of light in the same wavelength region has not always been sufficient in the fluorine-containing cured product.

To solve the above problems, LED encapsulated with a glass prepared with a sol-gel method were proposed (4). This LED makes it possible to reduce hygroscopicity through an encapsulating material and decrease in light transmission due to discoloration of an encapsulating material, and additionally improve heat resistance. However, in the sol-gel glass, fine pores are liable to remain and cracks are easily generated. Therefore, there was the problem that when water enters the fine pores or crack sites, the water disturbs performance of LED. Furthermore, a glass is generally poor in adhesion between a substrate and a wiring metal as compared with a resin. Therefore, there was the problem that water enters from the interface between an encapsulating glass and the substrate or the wiring metal.

It has also been proposed that a low melting glass is heat melted, and LED is transparently encapsulated with the melt (5). However, where a low melting glass is generally heat melted, it is necessary to heat the glass to a temperature of from 400 to 700° C. Therefore, a phosphor used in LED may undergo heat deterioration.

To those problems, a silicone resin (polyorganosiloxane) having excellent heat resistance and ultraviolet resistance is used as a substitute of the epoxy resin. However, silicone resins up to now tend to scar easily, and are not yet sufficient in adhesion, colorless transparency, heat resistance, resistance to moist heat and UV resistance (5, 6, 7, 8, 9).

With the recent development of GaN-based devices which emit short wavelength radiation such as blue light or ultraviolet light, and subsequently white light by combining these light emitting diodes with a fluorescent phosphor, the material requirements for the encapsulant has significantly increased. Materials should be able to withstand exposure to radiation of high intensity without degradation in optical and mechanical properties.

Therefore, there is a need for a simple method of preparing robust LED encapsulants with superior optical clarity, high temperature-resistance, UV-resistance, high refractive index, and with variable elastic properties (preferably soft to hard materials). The present invention allows such properties to be achieved. There is also a need for a simple method of modifying the mechanical properties of LED encapsulants without sacrificing their optical clarity, high temperature-resistance and UV-resistance. The present invention allows such properties to be achieved.

SUMMARY OF THE INVENTION

The present invention provides a curable polyorganosiloxane that can be used in encapsulation at a temperature far lower than 300° C., has excellent light transmission properties (colorless transparency) in a wavelength region of from ultraviolet light to visible light, light resistance, heat resistance, resistance to moist heat and UV resistance, and does not generate cracks and peeling even in use over a long period of time. In this respect, the term "colorless transparency" refers to the ability to transmit light having a wavelength region (350 to 800 nm) of from near ultraviolet light to visible light, and means that light transmittance of a cured film (thickness: at least 100 um) in such a wavelength region is preferably 80% or more, and more preferably 90% or more.

In an embodiment of the invention an encapsulating material is provided using the curable polyorganosiloxane, and a material for aerospace industry utilizing its excellent properties, in order to overcome the above-described problems in the prior art.

The polyorganosiloxanes of the invention may be used alone, or may be used as a composite with other material. For example, as a material for aerospace industry, the polyorganosiloxane is combined with a carbon-based nanomaterial to form a composite, and such a composite can be used as a material for removing static electricity, a conductive adhesive, a gasket material, a flash defensive material, an electromagnetic shielding material, a tank material, a rocket outer material and the like.

In one embodiment, a method is provided for producing a curable polyorganosiloxane in which a silane, compound contains at least one vinyl group or hydrosilyl group, and one condensable group, is reacted with a siloxane backbone in the presence of a hydrosilylation catalyst to produce said curable polyorganosiloxane, wherein the catalyst is removed from the curable polyorganosiloxane prior to curing.

More particularly, a method is provided for producing a curable polyorganosiloxane where the silane has a weight average molecular weight of 3,000 or more, and/or a compound provides the 'siloxane backbone' has a weight average molecular weights of 3,000 or more, where the weight average molecular weight of the silane and the 'siloxane backbone' compound are determined by gel permeation chromatography using a polystyrene standard material in calibration curve measurement.

More particularly, this invention provides a process for producing a curable polyorganosiloxane represented by the following general formula, characterized in that a noble metal oxide is used as a catalyst:

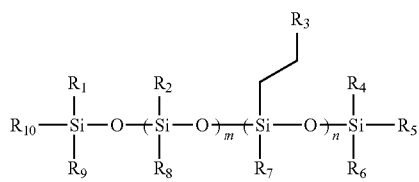

where R1 to R10 each independently represent a group selected from hydride, alkyl, alkenyl, aryl, condensable silyl group and non-condensable silyl group, with the proviso that at least one of R1 to R10 is a condensable silyl group, and m and n each are an integer of 0 or more.

In another embodiment, a method is provided for producing a curable polyorganosiloxane, wherein the noble metal oxide has a particle diameter of from 0.01 μm to 1 mm. In yet another embodiment, the metal noble metal oxide can be removed by filtration and/or centrifugal separation. There is also a possibility that the noble metal catalyst is used as a fixed-bed catalyst.

In another embodiment of the invention, curable polyorganosiloxane compositions are provided. In a preferred embodiment, the curable polyorganosiloxane compositions are provided containing at least two condensable silyl groups in one molecule.

In yet another embodiment, silicone members obtained by curing the curable compositions of the above invention are provided. The silicone members disclosed can be used in semiconductor luminescent devices or in devices used within the aerospace industry.

In one embodiment, a curable composition comprised of the curable polyorganosiloxanes may contain solvents, adhesion promoters (e.g. epoxy containing material), and/or filler-like materials (e.g. silica-gel or nano sized carbon) known to those of skill in the art.

As a result of extensive and intensive investigations, it has been found that according to a specific method for producing a curable polyorganosiloxane, a polyorganosiloxane capable of satisfying the above objects can be obtained. Additionally, the use of solid metal noble catalysts in the present invention means that, because they can easily removed from the reaction products, substantially less catalyst residue is present in the curable polyorganosiloxane compared to when using conventional methods that rely on fixed supported catalyst. As a result, undesirable side-reactions, originating from the presence of such catalyst residue, are reduced. This contributes to markedly improve storage stability of a polyorganosiloxane product.

It has been further found that the noble metal oxide catalyst separately recovered can be reused, which is a preferred system industrially and economically.

The invention also allows for the mechanical properties of the elastomeric resins to be varied and/or tuned to the desired stiffness, toughness and flexibility that best suit the specific application. The system offers a range of material platforms that fulfill all of the requirements and function as advanced encapsulating materials for both LED devices, as well as other emerging applications.

The polyorganosiloxanes of the invention are suitable for use not only in the LED field, but as materials for the aerospace industry that requires various properties such as light transmission properties (colorless transparency), light resistance, heat resistance, resistance to moist heat and UV resistance, and other materials.

BRIEF DESCRIPTION OF THE DRAWINGS

For a more complete understanding of the present invention, reference is now made to the following descriptions taken in conjunction with the accompanying figures, in which:

FIG. 8 shows a table 1 that compares the properties of polyorganosiloxanes made with platinum catalysts of the present invention compared to more conventional platinum

DETAILED DESCRIPTION OF THE INVENTION

Figure 1:
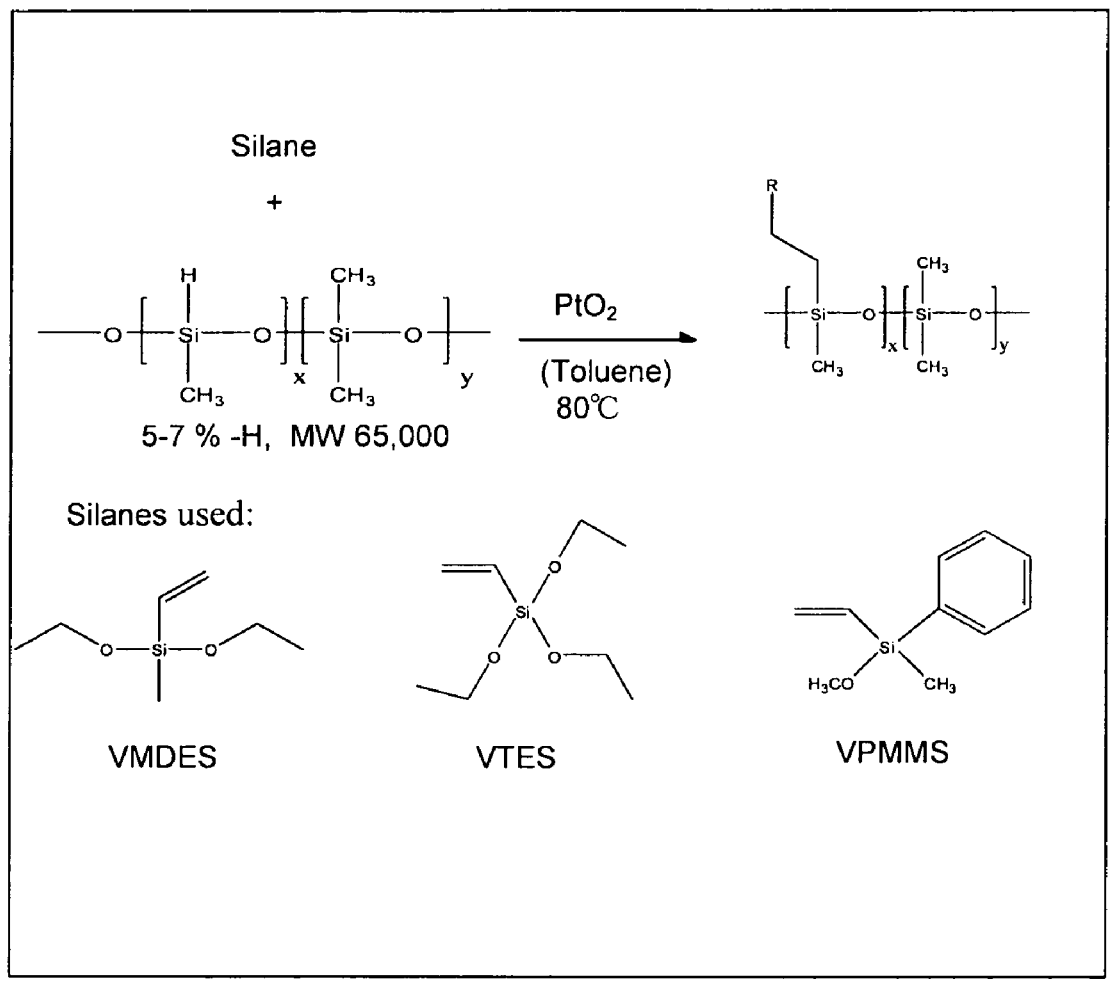
FIG. 1 shows a flow chart that represents an example of the general procedure for the preparation of the functionalized PDMS-based encapsulants.

The invention relates to a method for producing a silicone resin, and is characterized in that a (solid granular) platinum oxide catalyst is used in hydrosilylation. This hydrosilylation catalyst, however, is not present in the subsequent curing reaction, and accordingly the final cured product. Silicone resins produced by the above method have excellent adhesion, transparency, resistance to moist heat and UV resistance, and are therefore useful in various applications such as an encapsulation resin of LED, a phosphor paste and an aerospace material.

The novel processes described herein are able to produce curable polyorganosiloxanes having the general formula of:

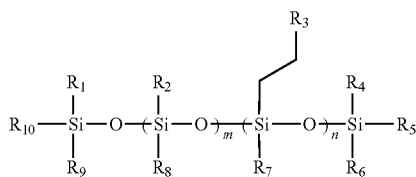

where $R_1$ to $R_{10}$ each independently represent a group selected from hydride, alkyl, alkenyl, aryl, condensable silyl group and non-condensable silyl group, with the proviso that at least one of $R_1$ to $R_{10}$ is a condensable silyl group, and m and n each are an integer of 0 or more.

Preferred specific examples of the above general formula in the specification are as follows:

The alkyl, alkenyl, aryl, condensable silyl group and non-condensable silyl group may be substituted with a halogen atom. Examples of the preferred alkyl include methyl, ethyl, propyl and trifluoropropyl. An example of the preferred alkenyl includes vinyl. An example of the preferred aryl includes phenyl. An example of a preferred condensable group on the condensable silyl group includes a silyl group having a structure that each group of hydroxyl, alkoxy, acetoxy, enoxy, oxime, amino and amide is directly bonded to Si atom. Examples of the preferred alkoxy include methoxy, ethoxy, propoxy and phenoxy. An example of a preferred non-condensable group on the non-condensable silyl group includes a silyl group having a structure that each group of alkyl, alkenyl and aryl is directly bonded to Si atom.

A method for producing a curable polyorganosiloxane is also provided in which a silane, compound contains at least one vinyl group or hydrosilyl group, and one condensable group, is reacted with a siloxane backbone in the presence of a hydrosilylation catalyst to produce said curable polyorganosiloxane, wherein the catalyst is removed from the curable polyorganosiloxane prior to curing.

Silanes used in this invention have at least one vinyl group or one hydrosilyl group as well as one condensable group on it. Those vinyl and condensable groups may be directly bonded to Si atom and may be indirectly attached to Si atom means via some other groups like alkylene groups. An example of a preferred condensable group includes hydroxyl, alkoxy, acetoxy, enoxy, oxime, amino and amide group. Examples of the preferred alkoxy include methoxy, ethoxy, propoxy and phenoxy.

A 'siloxane backbone' of the present invention contains at least one hydrosilyl group or a vinyl group. If the silane defined above has a vinyl group, then the 'siloxane backbone' will have a hydrosilyl group, and vice versa. A hydrosilyl group or vinyl group can be located at the end of the 'siloxane backbone' and/or along the backbone. A preferred 'siloxane backbone' is H-PDMS.

The novel processes of the invention can also produce curable polyorganosiloxanes made with i) a vinyl-containing compound having a weight average molecular weight of 3,000 or more obtained by measuring with GPC (gel permeation chromatography) using a polystyrene standard material in calibration curve measurement, and/or ii) a hydrosilyl-containing compound having a weight average molecular weight of 3,000 or more obtained by measuring with GPC (gel permeation chromatography) using a polystyrene standard material in calibration curve measurement.

The vinyl-containing compound preferably contains a compound having 4 or less, preferably 3 or less and more preferably 2 or less vinyl groups in one molecule in a proportion of 50 mol % or more from the standpoint of cost and general-purpose properties. From the standpoint of increasing the degree of crosslinking and improving physical strength of a cured product, a compound having a structure that siloxane high molecular chains are extended to at least three directions with a center on its optional silicon atom is also preferred. Specifically, compounds generally called T-type silicone resin by one skilled in the art of this field can be illustrated. Furthermore, the vinyl-containing compound can use the commercially available products. Specific examples of the vinyl-containing compound include DMS Series, PDV Series, FMV Series, VDT Series, VQM Series, VMS Series, VTT Series and MTV Series, products of Gelest, Inc.: ME-91, a product of Momentive Performance Materials; and vinylphenylmethylmethoxysilane (VPMMS), vinylmethyldiethoxysilane (VMDES), and vinyltriethoxysilane (VTES) that are vinyl-containing silane coupling agents.

The hydrosilyl-containing compound can be those commercially available. Specific examples of these include HMS Series, DMS Series, HES Series, HDP Series, HPM Series and HAM Series, products of Gelest, Inc.; and KF-99 and KF-9901, products of Shin-Etsu Chemical Co., Ltd.

In a preferred embodiment, the process produces curable polyorganosiloxanes comprising of at least two condensable silyl groups in one molecule. An example of a preferred condensable group on the condensable silyl group includes a silyl group having a structure that each group of hydroxyl, alkoxy, acetoxy, enoxy, oxime, amino and amide is directly bonded to Si atom. Examples of the preferred alkoxy include methoxy, ethoxy, propoxy and phenoxy. Above all, a trialkoxysilyl group is preferred.

In a preferred embodiment, the process comprises of using noble metal oxides as catalysts. Specific examples of the noble metal oxide are oxides of Pt, Rh, Ru, Ir, Pd and Fe. For, for example, hydrosilylation reaction, $PdO_2$ is more preferable because of its higher catalytic activity. These oxides can be used in solid granular form, and can be removed from the reaction by processes known to those of skill in the art, such as filtration and centrifugation. Alternatively, such catalysts can be present as a fixed bed catalyst. Either way, the result is that such catalysts are not part of the curable polyorganosiloxane composition, and accordingly such catalysts are not part of the final cured product, as evident using more traditional processes.

In another embodiment, the curable polyorganosiloxanes of the invention can be cured substantially using only condensation reaction, without requiring a hydrosilylation catalyst.

FIG. 1 represents the general procedure for the preparation of these silicone-based encapsulant resins which involved primarily the functionalization/modification of a methylhydridopolydimethylsiloxane (H-PDMS). Mono-, di-, and trialkoxy silanes were incorporated along the polysiloxane backbone using a solid $PtO_2$ catalyst. Toluene was added to reduce the viscosity of the resin mixture in order to facilitate effective mixing and better reaction conversion. The reaction was carried out overnight with stirring at 80° C. The liquid resin was then centrifuged to remove the solid platinum catalyst. Residual toluene can be simply removed by vacuum. The resulting clear, colorless, viscous, catalyst-free resin was then cured at 150° C. for no less than 6 hours.

This single-component, catalyst-free, PDMS-based liquid resin is unique and different from other conventional PDMS-based resins. See for example U.S. Pat. No. 7,160,972 B2 that discloses a polysiloxane-based resin typically employing the same platinum-cure or vinyl addition cure chemistry. Such resin type requires 2-part systems, where part A contains the platinum catalyst together with vinylsiloxane copolymer and part B is the hydridosiloxane copolymer.

The one-step, one-pot process is simple and cost-effective. The key point is simplicity. A single-component, catalyst-free system eliminates problems that may arise due to unwanted side reactions between the components of an LED package (i.e. LED chip, phosphors, packaging cup, etc.).

Another critical advantage of this approach is the versatility in the structure and functionality of various vinyl (mono-, di- and tri-) alkoxy silane that is incorporated along the PDMS backbone. This multifunctional system is less susceptible to inhibition than chain-end functionalized systems. This enables a library of resins to be prepared with controllable degrees of crosslinking, and thus offer a wide variety of physical properties. Thermal (addition-dehydration) curing of the elastomeric resin results in an optically clear and thermally stable crosslinked matrix, thus making the system suitable for LED encapsulant application as well as for aerospace industry. The performance of these encapsulant materials is significantly improved when compared to other commercial silicone resins.

Uses of the Semiconductor Light-emitting Device Members Made with the Polyorganosiloxanes of the Invention The semiconductor light-emitting device member in the present invention is not particularly limited in its use and can be used for various purposes including as a member (sealing compound) for sealing a semiconductor light-emitting device and the like. Among others, by combining with phosphor particles and/or inorganic oxide particles, the semiconductor light-emitting device member in the present invention can suitably be used for specific purposes. The combined use with phosphor particles is described below.

Combined Use with Phosphor Particles

The semiconductor light-emitting device member in the present invention can be used, for example, as a wavelength conversion member by dispersing a phosphor in the semiconductor light-emitting device member for molding inside a semiconductor light-emitting device cup or coating as a thin film on an appropriate transparent support. One phosphor may be used alone or two or more types of phosphors may be used in an arbitrary combination and ratio for example to make the light-emitting device, 'White LED'.

Phosphor

Composition of the phosphor is not particularly limited, but it is preferable to combine a crystalline matrix, for example, metallic oxide such as $Y_2O_3$ and $Zn_2SiO_4$, phosphate such as $Ca_5(PO_4)_3Cl$, or sulfide such as ZnS, SrS, and CaS with ions of rare earth metal such as Ce, Pr, Nd, Pm, Sm, Eu, Tb, Dy, Ho, Er, Tm, and Yb or ions of metal such as Ag, Cu, Au, Al, Mn, and Sb as an activator or coactivator.

Preferable examples of the crystalline matrix include sulfide such as (Zn, Cd)S, $SrGa_2S_4$, SrS, and ZnS, oxysulfide such as $Y_2O_2S$, aluminate such as $(Y, Gd)_3Al_5O_{12}$, $YAlO_3$, $BaMgAl_{10}O_{17}$, $(Ba, Sr)(Mg, Mn)Al_{10}O_{17}$, $(Ba, Sr, Ca)(Mg, Zn, Mn)Al_{10}O_{17}$, $BaAl_{12}O_{19}$, $CeMg Al_{11}O_{19}$, $(Ba, Sr, Mg)O.Al_2O_3$, $BaAl_2Si_2O_8$, $SrAl_2O_4$, $Sr_4Al_{14}O_{25}$, and $Y_3Al_5O_{12}$, silicate such as $Y_2SiO_5$ and $Zn_2SiO_4$, oxide such as $SnO_2$ and $Y_2O_3$, borate such as $GdMgB_5O_{10}$, $(Y, Gd)BO_3$, halophosphate such as $Ca_{10}(PO_4)_6(F, Cl)_2$ and $(Sr, Ca, Ba, Mg)_{10}(PO_4)_6Cl_2$ and phosphate such as $Sr_2P_2O_7$ and $(La, Ce)PO_4$.

However, the above crystalline matrix and the activator or coactivator are not particularly limited in elemental composition and can partially be substituted by analogous elements, and a resultant phosphor can be used if it absorbs light in the near-ultraviolet to visible region and emits visible light.

More specifically, substances shown below can be used as a phosphor, but these are only exemplary substances and phosphors that can be used in the present invention are not limited to these. In the exemplification shown below, phosphors whose structure is different only partially are shown in an abbreviated manner when appropriate. For example, "$Y_2SiO_5:Ce^{3+}$", "$Y_2SiO_5:Tb^{3+}$", and "$Y_2SiO_5:Ce^{3+}, Tb^{3+}$" are shown in a unifying manner as "$Y_2SiO_5:Ce^{3+}, Tb^{3+}$", and "$La_2O_2S:Eu$", "$Y_2O_2S:Eu$" and "$(La, Y)_2O_2S:Eu$" are shown in a unifying manner as "$(La, Y)_2O_2S:Eu$". An abbreviated location is delimited by a comma (,).

Red Phosphor

The range of concrete wavelengths of fluorescence emitted by a phosphor that emits red fluorescence (hereinafter referred to as a "red phosphor" when appropriate) is exemplified as usually 570 nm or more, preferably 580 nm or more, and usually 700 nm or less, preferably 680 nm or less.

Such red phosphors include a europium activation alkaline earth silicon nitride phosphor represented by $(Mg, Ca, Sr, Ba)_2Si_5N_8:Eu$ and configured by fracture particles having a red fracture surface to emit light in the red region and europium activation rare earth oxychalcogenide phosphor represented by $(Y, La, Gd, Lu)_2O_2S:Eu$ and configured by grown particles having approximately a spherical shape as a regular crystal growth shape to emit light in the red region.

Further, a phosphor containing oxynitride and/or oxysulfide containing at least one element selected from a group consisting of Ti, Zr, Hf, Nb, Ta, W, and Mo disclosed by Japanese Patent Application Laid-Open No. 2004-300247 and containing an α-sialon structure in which part or all of Al elements are substituted by the Ga elements can also be used in the present embodiment. Such a phosphor is a phosphor containing oxynitride and/or oxysulfide.

As other red phosphors, an Eu activation oxysulfide phosphor such as $(La, Y)_2O_2S:Eu$, Eu activation oxide phosphor such as $Y(V, P)O_4:Eu$ and $Y_2O_3:Eu$; Eu, Mn activation silicate phosphor such as $(Ba, Sr, Ca, Mg)_2SiO_4:Eu$, Mn and $(Ba, Mg)_2SiO_4:Eu$, Mn; Eu activation sulfide phosphor such as (Ca, Sr)S:Eu, Eu activation aluminate phosphor such as $YAlO_3:Eu$, Eu activation silicate phosphor such as $LiY_9$ $(SiO_4)_6O_2$:Eu, $Ca_2Y_8(SiO_4)_6O_2$:Eu, $(Sr, Ba, Ca)_3SiO_5$:Eu, and $Sr_2BaSiO_5$:Eu, Ce activation aluminate phosphor such as $(Y, Gd)_3Al_5O_{12}$:Ce and $(Tb, Gd)_3Al_5O_{12}$:Ce, Eu activation nitride phosphor such as $(Ca, Sr, Ba)_2Si_5N_8$:Eu, $(Mg, Ca, Sr, Ba)SiN_2$:Eu, and $(Mg, Ca, Sr, Ba)AlSiN_3$:Eu, Ce activation nitride phosphor such as $(Mg, Ca, Sr, Ba)AlSiN_3$:Ce; Eu, Mn activation halophosphate phosphor such as $(Sr, Ca, Ba, Mg)_{10}(PO_4)_6Cl_2$:Eu, Mn; Eu, Mn activation silicate phosphor such as $(Ba_3Mg)Si_2O_8$:Eu, Mn and $(Ba, Sr, Ca, Mg)_3(Zn, Mg)Si_2O_8$:Eu, Mn; Mn activation germanide phosphor such as $3.5MgO.0.5MgF_2.GeO_2$:Mn, Eu activation oxynitride phosphor such as Eu activation α-sialon; Eu, Bi activation oxide phosphor such as $(Gd, Y, Lu, La)_2O_3$:Eu, Bi; Eu, Bi activation oxysulfide phosphor such as $(Gd, Y, Lu, La)_2O_2S$:Eu, Bi; Eu, Bi activation vanadate phosphor such as $(Gd, Y, Lu, La)VO_4$:Eu, Bi; Eu, Ce activation sulfide phosphor such as $SrY_2S_4$:Eu, Ce; Ce activation sulfide phosphor such as $CaLa_2S_4$:Ce; Eu, Mn activation phosphate phosphor such as $(Ba, Sr, Ca)MgP_2O_7$:Eu, Mn and $(Sr, Ca, Ba, Mg, Zn)_2P_2O_7$:Eu, Mn; Eu, Mo activation tungstate phosphor such as $(Y, Lu)_2WO_6$:Eu, Mo; Eu, Ce activation nitride phosphor such as $(Ba, Sr, Ca)_xSi_yN_z$:Eu, Ce (x, y, and z are integers equal to 1 or greater); Eu, Mn activation halophosphate phosphor such as $(Ca, Sr, Ba, Mg)_{10}(PO_4)_6(F, Cl, Br, OH)$:Eu, Mn and Ce activation silicate phosphor such as $((Y, Lu, Gd, Tb)_{1-x}Sc_{x-}Ce_y)_2(Ca, Mg)_{-r}(Mg, Zn)_{2+r}Si_{z-q}Ge_qO_{12+\delta}$ can also be used.

Also as a red phosphor, a red organic phosphor comprised of rare earth element ion complexes having anions such as β-diketonate, β-diketone, aromatic carboxylic acid, and Broensted acid as ligands, perylene pigment (for example, dibenzo{[f,f']-4,4', 7,7'-tetraphenyl}diindeno[1,2,3-cd:1',2',3'-Im]perylene), anthraquinone pigment, lake pigment, azo pigment, quinacridone pigment, anthracene pigment, isoindoline pigment, isoindolinone pigment, phthalocyanine pigment, triphenylmethane basic dye, indanthrone pigment, indophenol pigment, cyanine pigment, and dioxazine pigment can also be used.

Also, among red phosphors, those whose peak wavelength is 580 nm or more, preferably 590 nm or more, and 620 nm or less, preferably 610 nm or less can be suitably used as an orange phosphor. Examples such orange phosphors include $(Sr, Ba)_3SiO_5$:Eu, $(Sr, Mg)_3(PO_4)_2$: $Sn^{2+}$, and $SrCaAlSiN_3$:Eu.

Green Phosphor

The range of concrete wavelengths of fluorescence emitted by a phosphor that emits green fluorescence (hereinafter referred to as a "green phosphor" when appropriate) is exemplified as usually 490 nm or more, preferably 500 nm or more, and usually 570 nm or less, preferably 550 nm or less.

Such green phosphors include a europium activation alkaline earth silicon oxynitride phosphor represented by $(Mg, Ca, Sr, Ba)Si_2O_2N_2$:Eu and configured by fracture particles having a fracture surface to emit light in the green region and europium activation alkaline earth silicate phosphor represented by $(Ba, Ca, Sr, Mg)_2SiO_4$:Eu and configured by fracture particles having a fracture surface to emit light in the green region.

As other green phosphors, an Eu activation aluminate phosphor such as $Sr_4Al_{14}O_{25}$:Eu and $(Ba, Sr, Ca)Al_2O_4$:Eu, Eu activation silicate phosphor such as $(Sr, Ba)Al_2Si_2O_8$:Eu, $(Ba, Mg)_2SiO_4$:Eu, $(Ba, Sr, Ca, Mg)_2SiO_4$:Eu, and $(Ba, Sr, Ca)_2(Mg, Zn)Si_2O_7$:Eu; Ce, Tb activation silicate phosphor such as $Y_2SiO_5$:Ce, Tb activation boric acid phosphate phosphor such as $Sr_2P_2O_7-Sr_2B_2O_5$:Eu, Eu activation halosilicate phosphor such as $Sr_2Si_3O_8-2SrCl_2$:Eu, Mn activation silicate phosphor such as $Zn_2SiO_4$:Mn, Tb activation aluminate phosphor such as $CeMgAl_{11}O_{19}$:Tb and $Y_3Al_5O_{12}$:Tb, Tb activation silicate phosphor such as $Ca_2Y_8(SiO_4)_6O_2$:Tb and $La_3Ga_5SiO_{14}$:Tb; Eu, Tb, Sm activation thiogallate phosphor such as $(Sr, Ba, Ca)Ga_2S_4$:Eu, Tb, Sm; Ce activation aluminate phosphor such as $Y_3(Al, Ga)_5O_{12}$:Ce and $(Y, Ga, Tb, La, Sm, Pr, Lu)_3(Al, Ga)_5O_{12}$:Ce, Ce activation silicate phosphor such as $Ca_3Sc_2Si_3O_{12}$:Ce and $Ca_3(Sc, Mg, Na, Li)_2Si_3O_{12}$:Ce, Ce activation oxide phosphor such as $CaSc_2O_4$:Ce, Eu activation oxynitride phosphor such as $SrSi_2O_2N_2$:Eu, $(Sr, Ba, Ca)Si_2O_2N_2$:Eu, and Eu activation β-sialon and Eu activation α-sialon; Eu, Mn activation aluminate phosphor such as $BaMgAl_{10}O_{17}$:Eu, Mn; Eu activation aluminate phosphor such as $SrAl_2O_4$:Eu, Tb activation oxysulfide phosphor such as $(La, Gd, Y)_2O_2S$:Tb; Ce, Tb activation phosphate phosphor such as $LaPO_4$:Ce, Tb; sulfide phosphor such as ZnS:Cu, Al and ZnS:Cu, Au, Al; Ce, Tb activation borate phosphor such as $(Y, Ga, Lu, Sc, La)BO_3$:Ce, Tb; $Na_2Gd_2B_2O_7$:Ce, Tb; and $(Ba, Sr)_2(Ca, Mg, Zn)B_2O_6$:K, Ce, Tb; Eu, Mn activation halosilicate phosphor such as $Ca_8Mg(SiO_4)_4Cl_2$:Eu, Mn; Eu activation thioaluminate phosphor and thiogallate phosphor such as $(Sr, Ca, Ba)(Al, Ga, In)_2S_4$:Eu, and Eu, Mn activation halosilicate phosphor such as $(Ca, Sr)_8(Mg, Zn)(SiO_4)_4Cl_2$:Eu, Mn can also be used.

Also, organic phosphors such as a pyridine-phthalimide condensation derivative, fluorescent dyes such as benzooxazinone, quinazolinone, coumarin, quinophthalone, and naphthalate imide, and terbium complex having hexylsalicylate as a ligand can be used as a green phosphor.

Blue Phosphor

The range of concrete wavelengths of fluorescence emitted by a phosphor that emits blue fluorescence (hereinafter referred to as a "blue phosphor" when appropriate) is exemplified as usually 420 nm or more, preferably 440 nm or more, and usually 480 nm or less, preferably 470 nm or less.

Such blue phosphors include a europium activation barium-magnesium aluminate phosphor represented by $BaMgAl_{10}O_{17}$:Eu and configured by grown particles having approximately a hexagonal shape as a regular crystal growth shape to emit light in the blue region, europium activation calcium halophosphate phosphor represented by $(Ca, Sr, Ba)_5(PO_4)_3Cl$:Eu and configured by grown particles having approximately a spherical shape as a regular crystal growth shape to emit light in the blue region, europium activation alkaline earth chloroborate phosphor represented by $(Ca, Sr, Ba)_2B_5O_9Cl$:Eu and configured by grown particles having approximately a cubic shape as a regular crystal growth shape to emit light in the blue region, and europium activation alkaline earth aluminate phosphor represented by $(Sr, Ca, Ba)Al_2O_4$:Eu or $(Sr, Ca, Ba)_4Al_{14}O_{25}$:Eu and configured by fracture particles having a fracture shape to emit light in the blue region.

As other blue phosphors, an Sn activation phosphate phosphor such as $Sr_2P_2O_7$:Sn, Eu activation aluminate phosphor such as $Sr_4Al_{14}O_{25}$:Eu, $BaMgAl_{10}O_{17}$:Eu, and $BaAl_8O_{13}$:Eu, Ce activation thiogallate phosphor such as $SrGa_2S_4$:Ce and $CaGa_2S_4$:Ce, Eu activation aluminate phosphor such as $(Ba, Sr, Ca)MgAl_{10}O_{17}$:Eu and $BaMgAl_{10}O_{17}$:Eu, Tb, Sm; Eu, Mn activation aluminate phosphor such as $(Ba, Sr, Ca)MgAl_{10}O_{17}$:Eu, Mn; Eu activation halophosphate phosphor such as $(Sr, Ca, Ba, Mg)_{10}(PO_4)_6Cl_2$:Eu and $(Ba, Sr, Ca)_5(PO_4)_3(Cl, F, Br, OH)$:Eu, Mn, Sb; Eu activation silicate phosphor such as $BaAl_2Si_2O_8$:Eu and $(Sr, Ba)_3MgSi_2O_8$:Eu, Eu activation phosphate phosphor such as $Sr_2P_2O_7$:Eu, sulfide phosphor such as ZnS:Ag and ZnS:Ag, Al; Ce activation silicate phosphor such as $Y_2SiO_5$:Ce, tungstate phosphor such as $CaWO_4$, Eu, Mn activation boric acid phosphate phosphor such as (Ba, Sr, Ca)$BPO_5$:Eu, Mn, (Sr, Ca)$_{10}$(PO$_4$)$_6$.nB$_2$O$_3$:Eu, and 2SrO.0.84P$_2$O$_5$.0.16B$_2$O$_3$:Eu, and Eu activation halosilicate phosphor such as Sr$_2$Si$_3$O$_8$.2SrCl$_2$:Eu can also be used.

Also, organic phosphors such as a fluorescent dye of naphthalate imide, benzooxazole, styryl, coumarin, pilarizon, and triazole compounds and thulium complex can be used as a blue phosphor.

One phosphor may be used alone or two or more types of phosphors may be used in an arbitrary combination and ratio.

A media particle diameter of these phosphor particles is not particularly limited, but is usually 100 nm or more, preferably 2 μm or more, and still preferably 5 μm or more, and usually 100 μm or less, preferably 50 μm or less, and still preferably 20 μm or less. Also, the shape of phosphor particles is not particularly limited as long as formation of semiconductor light-emitting device members is not affected, for example, fluidity of a phosphor part formation liquid (liquid obtained by adding a phosphor to this invention's semiconductor light-emitting device member formation liquid) is not affected.

In the present invention, the method of adding phosphor particles is not particularly limited. If phosphor particles are in a good dispersion state, it is sufficient only to post-mix phosphor particles into the semiconductor light-emitting device member formation liquid. If phosphor particles tend to aggregate, they can be mixed in advance into the raw materials before hydrosilylation.

The present invention is described further specifically by the Examples, but it should be understood that the invention is not limited to the following Examples so far as the invention is not beyond its gist.

EXPERIMENTAL SECTION, DETAILED DESCRIPTION OF THE SPECIFIC

Example 1

Functionalization of Polydimethylsiloxane (PDMS) with Mono-alkoxy Silane

In a round bottom flask, charged with a stir bar, 2 g of toluene was mixed with 6 g of partially hydrogenated polydimethylsiloxane (H-PDMS (5-7% H, 65000 MW)), 1.12 g (2.8 mmol) of vinylphenylmethylmethoxysilane (VPMMS) and 1 mg (<200 ppm) of PtO$_2$ catalyst (average diameter of particle is 20 μm: the smallest particle size is approximately 0.5 μm in diameter and the largest particle size is approximately 50 μm in diameter). Mixture was allowed to react overnight at 80° C. using an oil bath. The liquid resin was then centrifuged for 10 minutes at 2000 rpm and decanted to remove the solid catalyst. Resin was then poured onto tared Teflon discs and cured at 150° C. for no less than 6 hours.

The following are the properties of the formulation:

| Cure processing characteristics | |
| --- | --- |
| Shelf-life (2 × viscosity) | 2 months at ambient temperature |
| Cure time at 150° C. | 6 hours |
| Cured Properties | |
| Optical transparency | 93% T at 400 nm |
| Thermal stability | 200° C. for 1 week |
| Elastic modulus | 1.15 MPa |
| Ultimate Stress | 0.60 MPa |
| Elongation at break | 40% |

Figure 2:
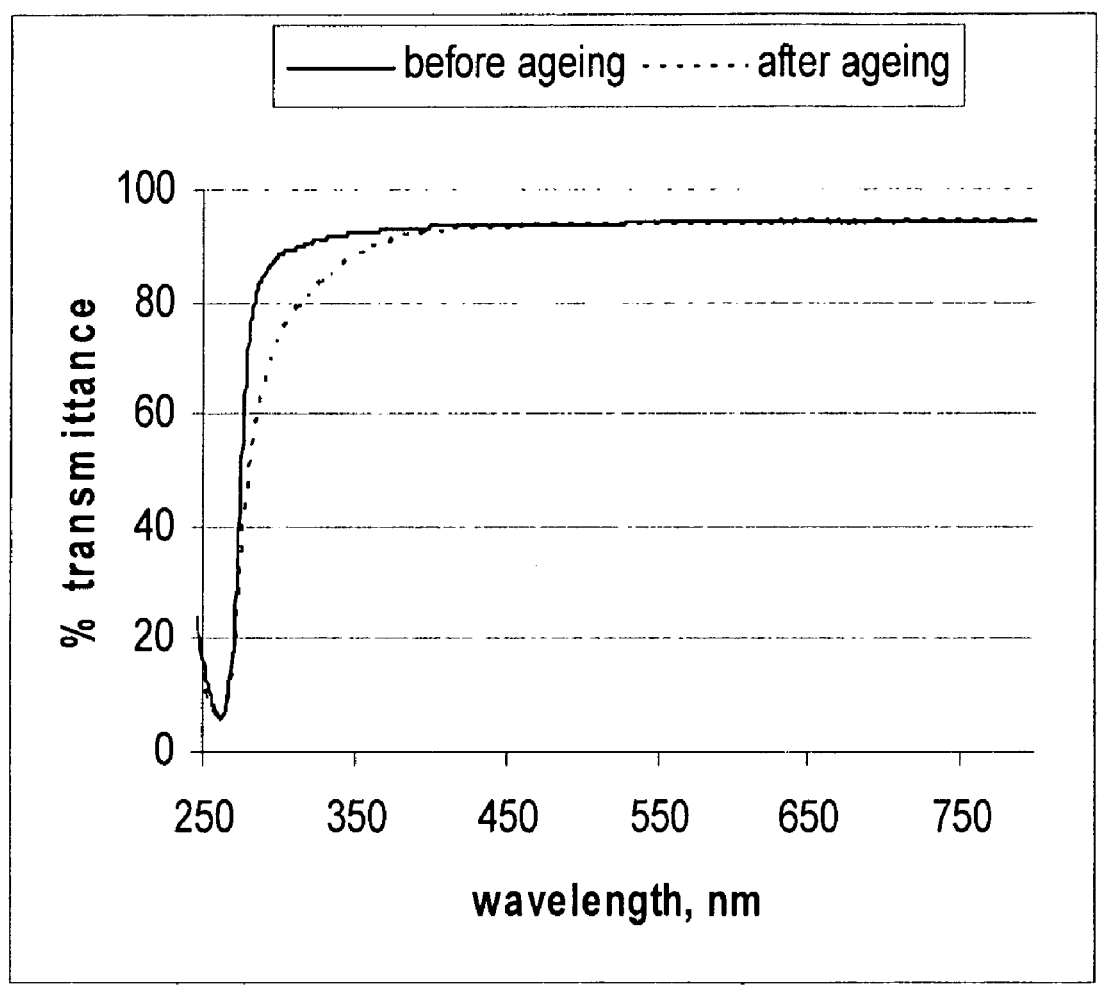
FIG. 2 shows a graph that compares the optical transmission before and after ageing at 200° C. for 1 week of the formulation containing a mono-alkoxy silane given in Example 1 of this invention.

FIG. 2 shows optical transmittance of greater than 90% throughout the 350 to 800 nm range for the formulation containing mono-alkoxy silane along the polysiloxane backbone from Example 1. Thermal stability of the cured resins was determined by ageing the cured discs in a 200° C. oven for up to 7 days. Weight loss was observed to be less than 5% indicating minimal shrinkage and out-gassing of volatiles. Despite the presence of phenyl groups, there was no observed yellowing and the optical transmittance was still greater than 90% indicating good thermal stability. The material is also stable up to 300 nm, which also indicates resistance to UV. These properties make these materials very much suitable for encapsulation of LED devices.

Example 2

Functionalization of Polydimethylsiloxane (PDMS) with Di-alkoxy Silane

In a round bottom flask, charged with a stir bar, 2 g of toluene was mixed with 6 g of H-PDMS (5-7% H, 65000 MW), 0.92 g (2.8 mmol) of vinylmethyldiethoxysilane (VM-DES) and 1 mg (<200 ppm) of PtO$_2$ catalyst (average diameter of particle is 20 μm: the smallest particle size is approximately 0.5 μm in diameter and the largest particle size is approximately 50 μm in diameter). Mixture was allowed to react overnight at 80° C. using an oil bath. The liquid resin was then centrifuged for 10 minutes at 2000 rpm and decanted to remove the solid catalyst. Resin was then poured onto tared Teflon discs and cured at 150° C. for no less than 6 hours.

The following are the properties of the formulation:

| Cure processing characteristics | |
| --- | --- |
| Shelf-life (2 × viscosity) | 2 months at ambient temperature |
| Cure time at 150° C. | 6 hours |
| Cured Properties | |
| Optical transparency | 93% T at 400 nm |
| Thermal stability | 200° C. for 1 week |
| Elastic modulus | 1.45 MPa |
| Ultimate Stress | 1.20 MPa |
| Elongation at break | 75% |

Figure 3:
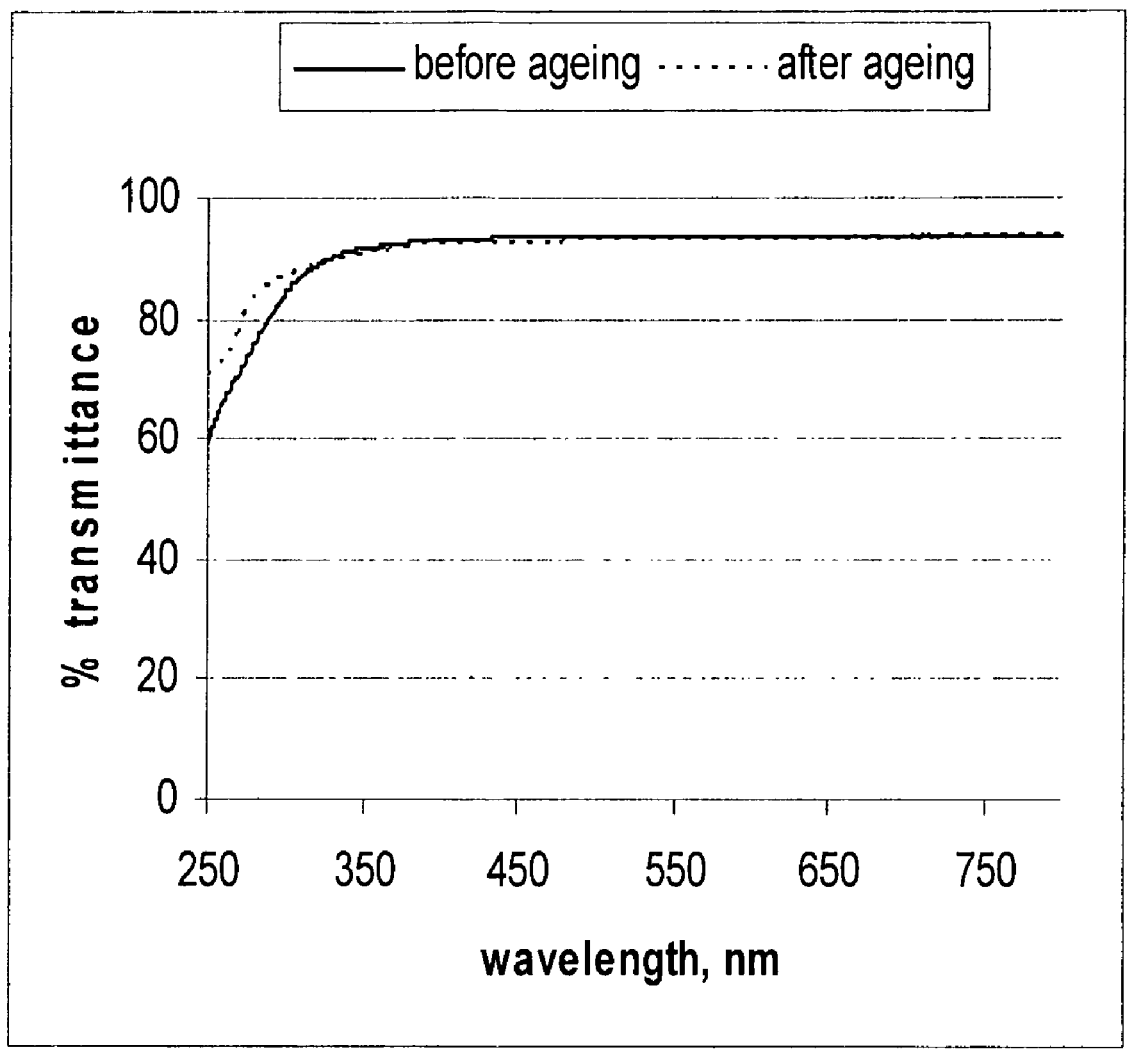
FIG. 3 shows a graph that compares the optical transmission before and after ageing at 200° C. for 1 week of the formulation containing a di-alkoxy silane given in Example 2 of this invention.

FIG. 3 shows the good optical properties of the formulation containing di-alkoxy silane along the silicone backbone from Example 2. Optical transmission is greater than 90% over the range of 350 to 800 nm. The material is stable at 200° C. for up to 1 week as indicated by minimal weight loss (<5 wt. %) and retention of good optical transparency (>90%). The material is very much suited for LED encapsulant application.

Example 3

Functionalization of Polydimethylsiloxane (PDMS) with Tri-alkoxy Silane

In a round bottom flask, charged with a stir bar, 2 g of toluene was mixed with 6 g of H-PDMS (5-7% H, 65000 MW), 1.10 g (2.8 mmol) of vinyltriethoxysilane (VTES) and 1 mg (<200 ppm) of PtO$_2$ catalyst (average diameter of particle is 20 μm: the smallest particle size is approximately 0.5 μm in diameter and the largest particle size is approximately 50 μm in diameter). Mixture was allowed to react overnight at 80° C. using an oil bath. The liquid resin was then centrifuged for 10 minutes at 2000 rpm and decanted to remove the solid catalyst. Resin was then poured onto tared Teflon discs and cured at 150° C. for no less than 6 hours.

The following are the properties of the formulation:

| Cure processing characteristics | |
| --- | --- |
| Shelf-life (2 × viscosity) | 2 months at ambient temperature |
| Cure time at 150° C. | 6 hours |
| Cured Properties | |
| Optical transparency | 93% T at 400 nm |
| Thermal stability | 200° C. for 1 week |
| Elastic modulus | 1.20 MPa |
| Ultimate Stress | 0.50 MPa |
| Elongation at break | 50% |

Figure 4:
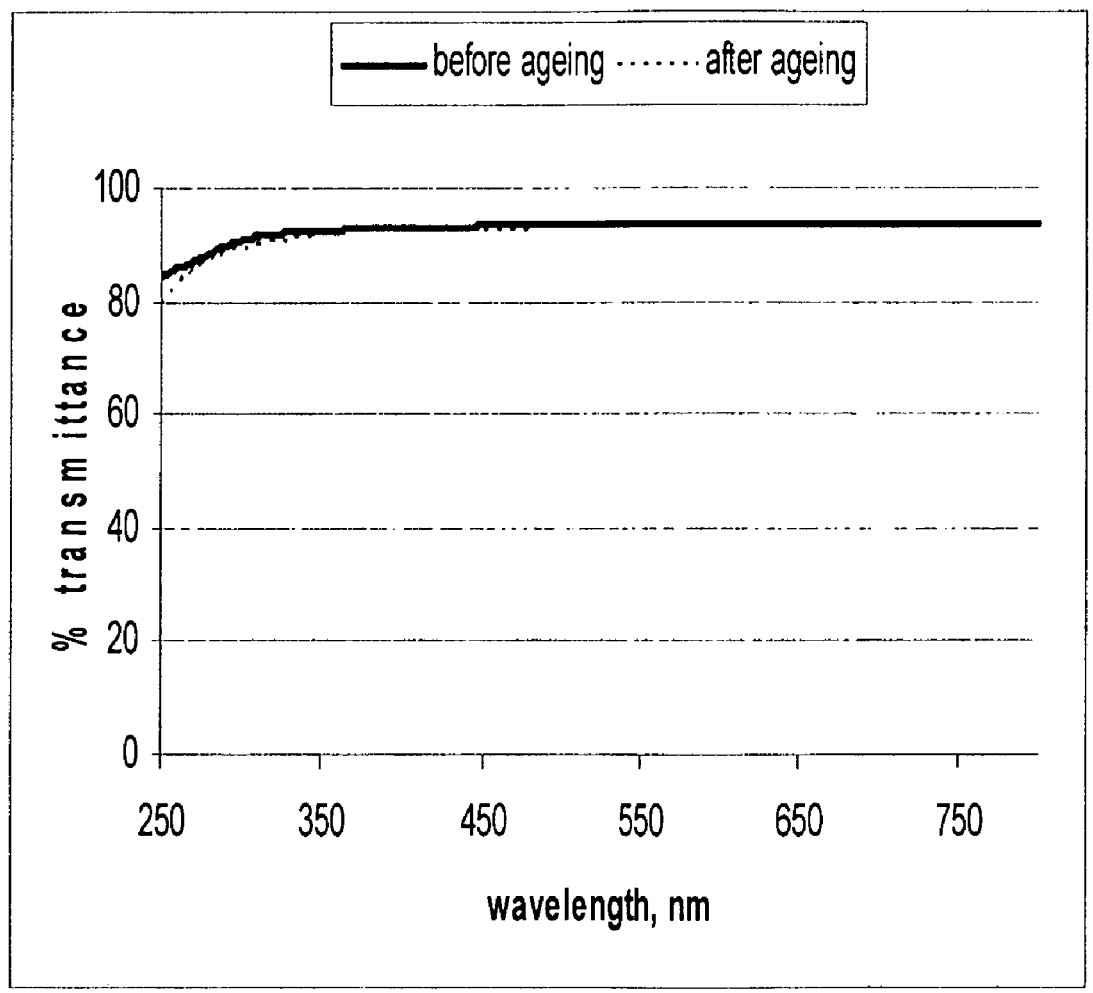
FIG. 4 shows a graph that compares the optical transmission before and after ageing at 200° C. for 1 week of the formulation containing a tri-alkoxy silane given in Example 3 of this invention.

FIG. 4 is the graph of the optical transmission before and after ageing at 200° C. for 1 week of the formulation containing a tri-alkoxy silane given in Example 3. Optical transmittance was greater than 90% from 300 to 800 nm, and still greater than 80% at 250 nm, indicating no thermal degradation is occurring. This material definitely qualifies for use as an encapsulant for LED devices.

Thermal (addition-dehydration) curing of the reinforced elastomeric resin results in an optically clear and thermally stable crosslinked matrix, thus making the system suitable for LED encapsulant application. The performance of these encapsulant materials is significantly improved when compared to other commercial silicone resins.

As presented in the U.S. Patent Application No. 20060084282, the addition of carbosilanes to silsesquioxane resins for low-K dielectric applications has lead to a significant improvement, about 3-6 times increase, in elastic modulus. The application of US Patent No. 20060084282 is hereby incorporated herein by reference. The present invention can incorporate the carbosilanes to provide additional improvements.

Example 4

Functionalization of Polydimethylsiloxane (PDMS) with Tri-alkoxy Silane and Reinforcement with bis(triethoxysilyl)ethane In a round bottom flask, charged with a stir bar, 2 g of toluene was mixed with 6 g of H-PDMS (5-7% H, 65000 MW), 1.10 g (2.8 mmol) of vinyltriethoxysilane (VTES) and 1 mg (<200 ppm) of $PtO_2$ catalyst (average diameter of particle is 20 μm: the smallest particle size is approximately 0.5 μm in diameter and the largest particle size is approximately 50 μm in diameter). Mixture was allowed to react overnight at 80° C. using an oil bath. The liquid resin was then centrifuged for 10 minutes at 2000 rpm and decanted to remove the solid catalyst. Prior to curing, 70 mg (2 wt. %) of bis(triethoxysilyl)ethane (BTESE) was added and mixture was stirred until completely homogeneous. Resin was then poured onto tared Teflon discs and cured at 150° C. for no less than 6 hours.

The following are the properties of the formulation:

| | PDMS + VTES | PDMS + VTES + BTESE |
| --- | --- | --- |
| Cure Processing Characteristics | | |
| Shelf life at ambient temperature | 2 months | 2 months |
| Cure time at 150° C. | 6 hours | 6 hours |
| Cured Properties | | |
| Optical transparency at 400 nm | 93% T | |
| Thermal stability | 200° C. for 1 week | 200° C. for 1 week |
| Elastic modulus, MPa | 1.33 | 0.84 |
| Ultimate Stress, MPa | 0.93 | 1.23 |
| Elongation at break | 57% | 81% |

Optical transmittance of greater than 90% throughout the 350 to 800 nm range for the formulation containing mono-alkoxy silane along the polysiloxane backbone and subsequently modified with bistriethoxysilylethane (Example 4) was obtained. Thermal stability of the cured resins was determined by ageing the cured discs in a 200° C. oven for up to 7 days. Weight loss was observed to be less than 5% indicating minimal shrinkage and out-gassing of volatiles, thus no thermal degradation is occurring. Despite the presence of phenyl groups, there was no observed yellowing and the optical transmittance was still greater than 90% indicating good thermal stability and retention of good optical transparency. The material is also stable up to 300 nm, which also indicates resistance to UV. These properties make these materials highly suitable for encapsulation of LED devices.

Figure 6:
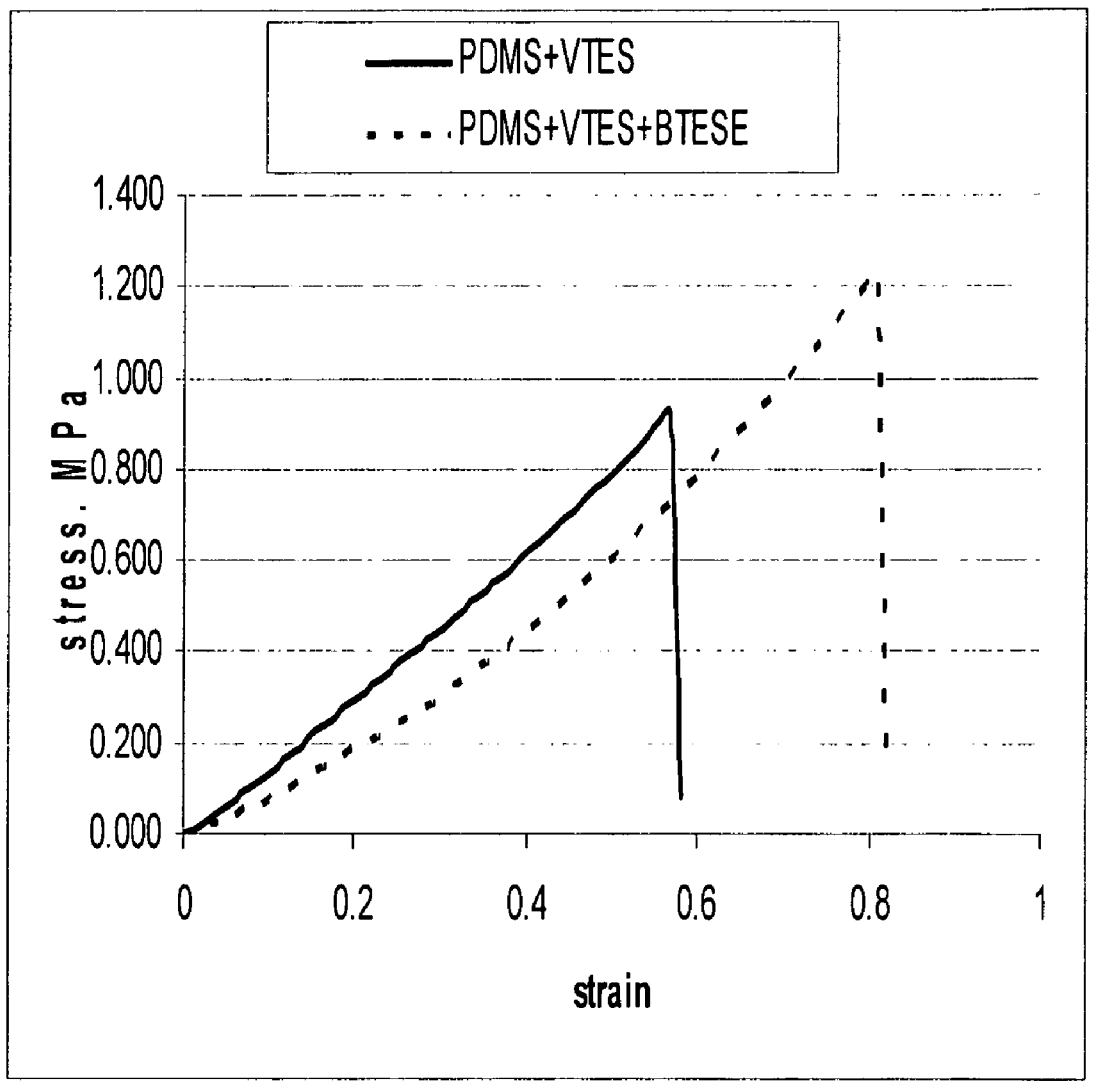
FIG. 6 shows a graph that compares the elastic modulus of the formulation containing a tri-alkoxy silane and the same formulation reinforced with bis(triethoxysilyl)ethane given in Example 4 of this invention.

FIG. 6 gives the isothermal stress-strain curves of the formulation containing a tri-alkoxy silane and the same formulation modified with bis(triethoxysilyl)ethane (BTESE) given in Example 4 of this invention. Addition of a small amount of carbosilane (2 wt. %) resulted in a 35% decrease in elastic modulus, from 1.33 to 0.84 MPa, coupled with a 30% increase in ultimate stress (0.93 to 1.23 MPa) and a 40% improvement in elongation (57% to 81%).

Example 5

Functionalization of Polydimethylsiloxane (PDMS) with Mono-alkoxy Silane and Reinforcement with bis(triethoxysilyl)ethane In a round bottom flask, charged with a stir bar, 2 g of toluene was mixed with 6 g of H-PDMS (5-7% H, 65000 MW), 102 mg (0.28 mmol) of vinylphenylmethylmethoxysilane (VPMMS) and 1 mg (<200 ppm) of $PtO_2$ catalyst (average diameter of particle is 20 μm: the smallest particle size is approximately 0.5 μm in diameter and the largest particle size is approximately 50 μm in diameter). Mixture was allowed to react overnight at 80° C. using an oil bath. The liquid resin was then centrifuged for 10 minutes at 2000 rpm and decanted to remove the solid catalyst. Different formulations were tried by adding the corresponding carbosilane modifiers to 3 g of the base resin: 1) 85 mg (2 wt. %) of bis(triethoxysilyl)ethane (BTESE); 2) 42 mg (1 wt %) of bis(triethoxysilyl)ethylene (BTESEt); 3) 42 mg (1 wt. %) of bis(triethoxysilyl)methane (BTESM); 4) 54 mg (1 wt. %) of bis(triethoxysilyl)octane (BTESO). Resins were mixed until completely homogeneous and then poured onto tared Teflon discs and cured at 150° C. for no less than 6 hours.

The following are the properties of the formulation:

|  | PDMS | +BTESE | +BTESEt | +BTESM | +BTESO |
|---|---|---|---|---|---|
| Cure Processing Characteristics |  |  |  |  |  |
| Shelf life at ambient temperature | 2 months | 2 months | 2 months | 2 months | 2 months |
| Cure time at 150° C. | 6 hours | 6 hours | 6 hours | 6 hours | 6 hours |
| Cured Properties |  |  |  |  |  |
| Optical transparency at 400 nm | 93% T | 93% T | 93% T | 93% T | 93% T |
| Thermal stability (1 Week) | 200° C. | 200° C. | 200° C. | 200° C. | 200° C. |
| Elastic modulus, MPa | 1.02 | 1.40 | 0.80 | 0.59 | 0.41 |
| Ultimate Stress, MPa | 0.40 | 0.70 | 0.74 | 0.54 | 0.80 |
| Elongation at break | 40% | 50% | 81% | 80% | 136% |

Figure 5:
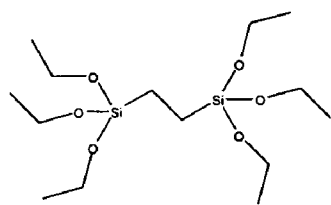
FIG. 5 gives the molecular structures of various carbosilanes that can be used to modify the mechanical properties of PDMS-based resins.
Figure 5:
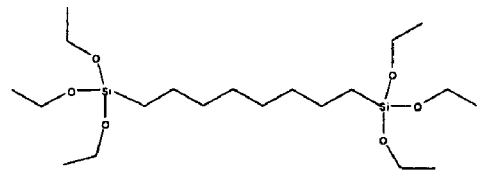
Figure 5:
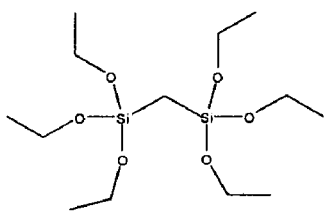
Figure 5:
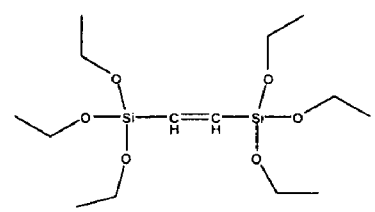

FIG. 5 illustrates the molecular structures of the various carbosilane modifiers investigated in this example. These modifiers were added prior to curing. The resulting clear, colorless, viscous, catalyst-free resin was cured at 150° C. for no less than 6 hours. Any cross-linking agent having more than one alkoxy silane can be used as a modifier. As is shown in this Example 5, the addition of carbosilane crosslinkers to the alkoxy-substituted resins does not affect their optical transparency and thermal stability but rather significantly improves and/or modifies the stiffness, toughness and flexibility of the resin.

Figure 7:
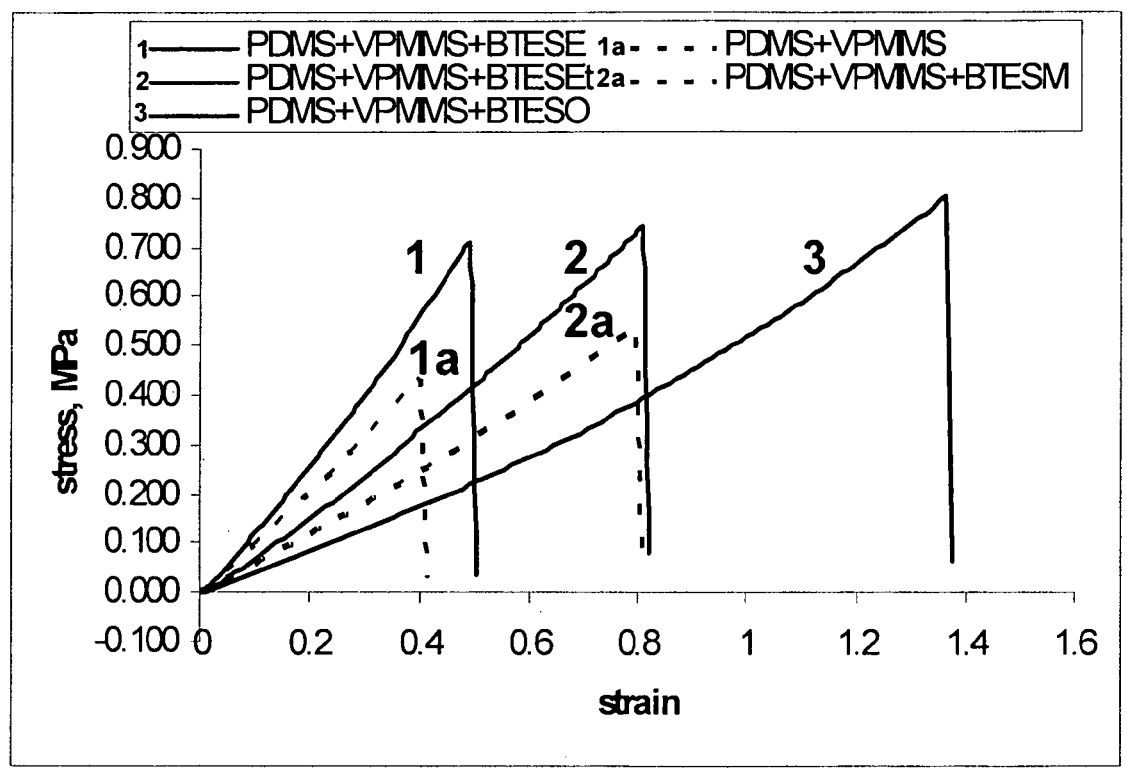
FIG. 7 shows a graph that compares the elastic properties of the formulation containing a mono-alkoxy silane and the same formulation modified with different carbosilanes given in Example 5 of this invention.

FIG. 7 compares the elastic properties of the formulation containing a mono-alkoxy silane and the same formulation modified with different carbosilanes given in Example 5 of this invention. Each carbosilane had a different effect on the mechanical properties of the resin. Improvement in modulus of 37% (from 1.02 to 1.40 MPa) was achieved when the resin was reinforced with bis(triethoxysilyl)ethane (BTESE). Ultimate stress was improved to about 2 times its original value (0.40 to 0.80 MPa) when bis(triethoxysilyl)octane (BTESO) was added. There was an observed doubling of the elongation (at break), from 40% to 80%, when either bis(triethoxysilyl)ethylene (BTESEt) or bis(triethoxysilyl)methane (BTESM) was used. Lastly, addition of bis(triethoxysilyl)octane (BTESO) resulted to greater than 3 times increase in elasticity (from 40% to 136%).

The following Examples 6-9 compare the properties of polyorganosiloxanes made either by methods and compositions of the present invention (Examples 6 and 7), or compositions using a conventional homogenious platinum catalyst complex (Examples 8 and 9).

Example 6

A stirring bar was placed in a round-bottom flask, and 2.0 g of toluene, 8.0 g of H-PDMS (5-7% H, 65000 MW), 1.1 g of vinyltriethoxysilane (VTES) and 1 mg of platinum oxide $PtO_2$ (average diameter of particle is 20 μm: the smallest particle size is approximately 0.5 μm in diameter and the largest particle size is approximately 50 μm in diameter) were added to the flask. Reaction was conducted at 80° C. for 12 hours with stirring. The platinum oxide catalyst was removed by centrifugal separation at 2,000 rpm for 10 minutes, and toluene was then removed under reduced pressure yielding a curable polyorganosiloxane A of the invention.

When Pt residual amount in the curable polyorganosiloxane A was measured with ICP emission spectral analysis, it was found to be less than 2 ppm (less than detection limit).

Example 7

A stirring bar was placed in a round-bottom flask, and 1.0 g of toluene, 3.0 g of H-PDMS (5-7% H, 65000 MW), 0.44 g of VMM-010 (a partially vinylated polydimethoxysiloxane, a product of Gelest, Inc.) and 1 mg of platinum oxide $PtO_2$ (average diameter of particle is 20 μm: the smallest particle size is approximately 0.5 μm in diameter and the largest particle size is approximately 50 μm in diameter) were added to the flask. Reaction was conducted at 80° C. for 12 hours with stirring. The platinum oxide catalyst was removed by centrifugal separation at 2,000 rpm for 10 minutes, and toluene was then removed under reduced pressure yielding a curable polyorganosiloxane B of the invention.

When Pt residual amount in the curable polyorganosiloxane B was measured with ICP emission spectral analysis, it was found to be less than 2 ppm (less than detection limit).

Example 8

A stirring bar was placed in a round-bottom flask, and 2.0 g of toluene, 8.0 g of H-PDMS (5-7% H, 65000 MW), and 1.0 g of vinylmethyldiethoxysilane (VMDES) were added. Then platinum-vinylsiloxane complex was added to the flask so that the concentration of Pt element in the reaction mixture would be 100 ppm. The reaction was conducted at 80° C. for 48 hours with stirring. Toluene was removed under reduced pressure yielding a polyorganosiloxane C.

The platinum complex catalyst was dissolved, and could not be removed with centrifugal separation.

Example 9

A stirring bar was placed in a round-bottom flask, and 2.0 g of toluene, 8.0 g of H-PDMS (5-7% H, 65000 MW), and 1.1 g of vinyltriethoxysilane (VTES) were added. Then platinum-vinylsiloxane complex was added to the flask so that the concentration of Pt element in the reaction mixture would be 100 ppm. The reaction was conducted at 80° C. for 48 hours with stirring. Toluene was removed under reduced pressure yielding a polyorganosiloxane D.

The platinum complex catalyst was dissolved or finely dispersed, and could not be removed with centrifugal separation.

LED packages were filled up with the resins A, B, C, and D respectively, and cured at 150° C. for 7 hours. The LED package used consists of Cu substrate having a 8 mm diameter dent covered with 1 mm thick Ag plating.

The package was subjected to hygroscopic treatment under atmosphere of 85° C. and 85% RH for 12 hours, and then held on a 260° C. hot plate for 10 seconds. Presence or absence of peeling between the resin and the package was visually checked using a microscope. The results are shown in FIG. 8, Table 1.

Table 1 shows a comparison of properties of polyorganosiloxanes produced using either the platinum catalyst of the present invention or conventional platinum catalysts. Although it is well known that noble metal complex such as platinum complex can introduce a side chain onto a linear polysiloxane using hydrosilylation, conventional catalyst system has a disadvantage of leaving the noble metal in the resin as shown in comparative Example 8. As a result, when a cured product containing substantial amount of catalyst residue is heated or irradiated with ultraviolet light, it may be colored. However, according to the present invention (Examples 1 through 7), noble metal oxide catalyst can easily be removed by a simple method such as centrifugal separation or filtration. Consequently, coloration of a cured product is not induced, and additionally, a condensable silyl group side chain can be crosslinked and cured by merely heating under ambient atmosphere without any catalyst. Therefore, such a resin can be an excellent candidate for a material which requires transparency, high thermal stability, and/or high UV or X-ray resistance.

Coloration appears in the resin B of Example 7 when heated at 260° C. This is considered to be due to the following phenomenon. VMM-010 (partially vinylated polydimethoxysiloxane, a product of Gelest, Inc.) used in a raw material of resin B has many vinyl groups in the molecule. Indeed, many of these unreacted vinyl groups remain in resin B as a result of ineffective hydrosilylation caused by steric hindrance. As a result, resin B becomes discolored when heated.

The following examples 10-12 show the performances of LEDs fabricated by using phosphor paste composites containing polyorganosiloxanes of the present invention.

Example 10

0.6 part by weight of bis(triethoxysilyl)ethane (BTESE), 8 parts by weight of silica fine particles (RX200, a product of Nippon Aerosil Co., Ltd.), 16.8 parts by weight of blue phosphor $Ba_{0.7}Eu_{0.3}MgAl_{10}O_{17}$ (particle diameter: 15 μm; hereinafter referred to as "BAM"), 1.5 parts by weight of green phosphor Ba 0.75 Sr 0.25 $SiO_4$:Eu (particle diameter: 16 μm; hereinafter referred to as "BSS") and 1.1 parts by weight of red phosphor Sr 0.8 Ca 0.2 AlSiN:Eu (particle diameter: 12 μm; hereinafter referred to as "SCASN") were mixed with 100 parts by weight of the resin A obtained in Example 6, and the resulting mixture was kneaded with a stirring device (AR-100), a product of THINKY, for 3 minutes to obtain a curable composition E of the invention.

Example 11

8 parts by weight of silica fine particles (RX200, a product of Nippon Aerosil Co., Ltd.), 16.8 parts by weight of blue phosphor BAM, 1.5 parts by weight of green phosphor BSS and 1.1 parts by weight of red phosphor SCASN were mixed with 100 parts by weight of the resin B obtained in Example 7, and the resulting mixture was kneaded with a stirring device (AR-100), a product of THINKY, for 3 minutes to obtain a curable composition F of the invention.

Example 12

6 parts by weight of silica fine particles (RX200, a product of Nippon Aerosil Co., Ltd.), 16.5 parts by weight of blue phosphor BAM, 1.5 parts by weight of green phosphor BSS and 1.1 parts by weight of red phosphor SCASN were mixed with 100 parts by weight of the commercially available addition-curing silicone resin (KER2500, a product of Shin-Etsu Chemical Co., Ltd.), and the resulting mixture was kneaded with a stirring device (AR-100), a product of THINKY, for 3 minutes to obtain a curable composition G of the invention.

Using the curable compositions (phosphor pastes) E, F and G prepared above, white LED of near ultraviolet excitation was prepared.

Light-emitting diode having an emission wavelength of 403 nm (C405XB900, a product of Cree Inc.) was wire-bonded to the bottom center of the dent of a package depicted in Example 9. A metal package provided with this light-emitting diode was filled with paste E, F and G, respectively. E and F were cured at 150° C. for 7 hours. And G was cured at 100° C. for 1 hour followed by additional curing at 150° C. for 5 hours.

350 mA current was passed through the white LEDs obtained above at 25° C. to measure the total light flux, and 350 mA current was then passed through the same LEDs in an atmosphere of 85° C. and 85% RH to conduct accelerated deterioration test for 500 hours. Thereafter, again, 350 mA current was passed through the white LED at 25° C. to measure the total light flux after the deterioration test, and its retention rate was calculated. The results obtained are shown in FIG. 8 Table 2.

As can be seen from Table 2, when the curable composition of the invention is used, white LEDs have less decrease of light emission intensity and higher reliability can be obtained as compared with LEDs of Example 12 which use a conventional curing catalyst.

The present application has been described using specific aspects of the invention. Additional descriptions of semiconductor light emitting devices, and LEDs in particular, as well as manufacturing methods therefore, and industrial applicability can be found in detail in European Patent No. WO2006090804 published Aug. 31, 2006, and also published as EP1854831 (A1), the specification of which is hereby incorporated herein in its entirety.

REFERENCES

1. US Patent Application Publication No. 2004/0063840
2. WIPO Publication No. WO2005/085303
3. Japanese Patent Document: JP-A-2002-203989
4. Japanese Patent Document: JP-A-2004-356506
5. U.S. Pat. No. 5,648,687
6. WIPO Publication No. WO2006/055456
7. U.S. Pat. No. 7,160,972
8. U.S. Pat. No. 6,204,523
9. U.S. Pat. No. 6,590,235

The invention claimed is:

1. A method for producing a curable polyorganosiloxane in which a silane compound contains at least one vinyl group or hydrosilyl group, and one condensable group, is reacted with a siloxane backbone in the presence of a hydrosilylation catalyst to produce said curable polyorganosiloxane, wherein the catalyst is removed from the curable polyorganosiloxane prior to curing.

2. The method of claim 1, wherein the curable polyorganosiloxane has the following formula:

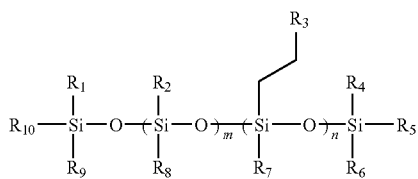

wherein R1 to R10 each independently represent a group selected from hydride, alkyl, alkenyl, aryl, condensable silyl group and non-condensable silyl group, with the proviso that at least one of R1 to R10 is a condensable silyl group, and m and n each are an integer of 0 or more.

3. The method of claim 1, wherein the hydrosilylation catalyst is a noble metal oxide.

4. The method of claim 3, wherein the noble metal oxide has a particle diameter of from 0.01 μm to 1 mm.

5. The method of claim 1, wherein the step for removing the catalyst is filtration and/or centrifugal separation.

6. The method of claim 1, wherein the hydrosilylation catalyst is used as a fixed bed catalyst.

7. The method of claim 1, wherein the silane has a weight average molecular weight of 3,000 or more, and/or the compound providing the 'siloxane backbone' has a weight average molecular weight of 3,000 or more, wherein the weight average molecular weight of the silane and the 'siloxane backbone' compound are determined by gel permeation chromatography using a polystyrene standard material in calibration curve measurement.

8. A curable polyorganosiloxane produced using the method of claim 1.

9. A curable composition comprising the curable polyorganosiloxane of claim 8.

10. The curable composition of claim 9, containing molecules containing at least two condensable silyl groups in one molecule.

11. A silicone member obtained by curing the curable composition of claim 9.

12. A semiconductor luminescent device comprising the silicone member of claim 11.

13. A member for aerospace industry comprising the silicone member of claim 11.

14. The method for producing a curable polyorganosiloxane of claim 1, further comprising curing said polyorganosiloxane.

* * * * *

UNITED STATES PATENT AND TRADEMARK OFFICE
CERTIFICATE OF CORRECTION

| | | |
|---|---|---|
| PATENT NO. | : 7,732,553 B2 | Page 1 of 1 |
| APPLICATION NO. | : 12/072891 | |
| DATED | : June 8, 2010 | |
| INVENTOR(S) | : Craig J. Hawker et al. | |

It is certified that error appears in the above-identified patent and that said Letters Patent is hereby corrected as shown below:

On the Title Page

Item (75) Inventors:

Please change the name "Kenichi Takizawa, Kitakyushu (JP)" to read --Kenichi Takizawa, Fukuoka-ken (JP)--

Please change the name "Yutaka Moti, Kitakyushu (JP)" to read --Yutaka Mori, Fukuoka-ken (JP)--

Signed and Sealed this
Fourteenth Day of April, 2015

Michelle K. Lee
*Director of the United States Patent and Trademark Office*